UNITED STATES PATENT OFFICE.

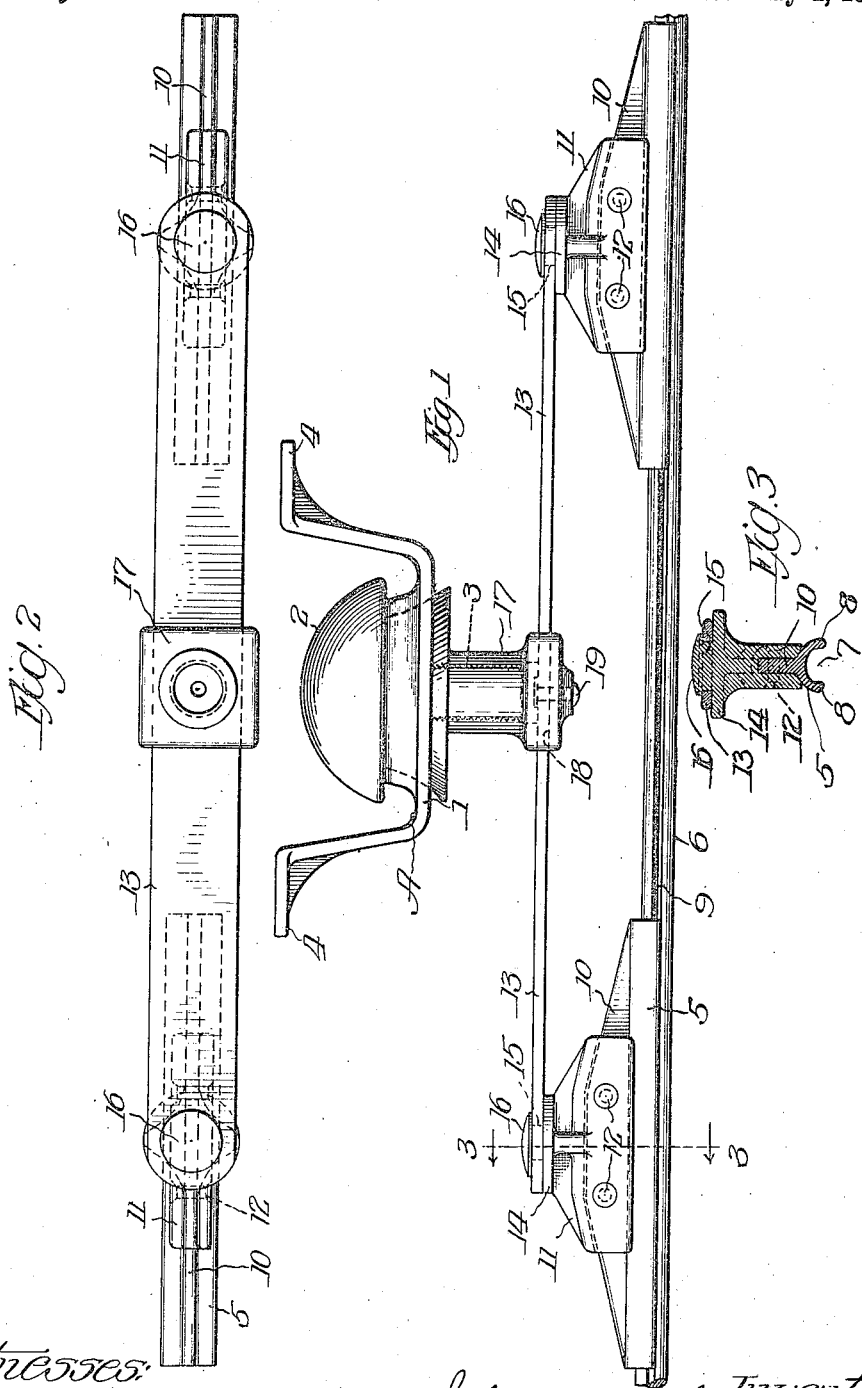

GLENN HENRY BOLUS, OF MANSFIELD, OHIO, ASSIGNOR TO THE OHIO BRASS COMPANY, OF MANSFIELD, OHIO, A CORPORATION OF NEW JERSEY.

SUSPENSION DEVICE FOR TROLLEY-WIRES.

1,138,184.   Specification of Letters Patent.   Patented May 4, 1915.

Application filed February 20, 1914. Serial No. 819.894.

*To all whom it may concern:*

Be it known that I, GLENN H. BOLUS, a citizen of the United States, and resident of Mansfield, in the county of Richland and State of Ohio, have invented certain new and useful Improvements in Suspension Devices for Trolley-Wires, of which the following is a specification.

My invention relates to improvements in suspension device for trolley wires, and one of the objects of my invention is to provide a device of this character which will be simple, durable and reliable in construction and effective and efficient in operation.

Other objects of my invention will appear hereinafter.

Referring to the accompanying drawings, Figure 1 is a view in elevation of a device embodying my invention, it being shown as being attached to an insulated hanger member or support; Fig. 2 is a plan view of said device, the insulated hanger member being removed, and Fig. 3 is a transverse sectional view on the line 3—3 of Fig. 1.

In the ordinary overhead construction for electric railways, as is well known, the trolley wires are rigidly fastened to ears which are rigidly attached to insulated hanger members, and these insulated hanger members are suspended from a suitable support. These supports are generally cross suspension wires but it often happens that the trolley wires pass under bridges, subways and the like and the hangers are therefore attached rigidly thereto. Wherever the hangers must be attached to these bridges or other supports there is no possibility of the supports yielding as the trolley pole passes along the wire and the consequence is that so-called "hard spots" are created which, as is well known, increase the liability of crystallization of the trolley wire and consequent breakage. These "hard spots" are not so likely to occur where the trolley wire is suspended from cross suspension wires for the suspension wires themselves will yield as a trolley pole exerts upward pressure on the trolley wire. My invention is intended to overcome these so-called "hard spots" in the system, and while the device may be used as a flexible suspension member or hanger in general, I have designed it more particularly for use in places where the trolley wire must be suspended from rigid supports, such as bridges, subways and the like.

The hanger member A shown in the drawings is therefore shown as being of the type which is adapted to be attached to bridges, subways or the like, or to be used in car-barns, but of course it will be understood that any other suitable hanger many be used, depending upon the particular conditions. This hanger, as will be seen, has a depressed center portion 1 having an insulator cap 2 from which depends a threaded stud 3 to which the trolley ear is attached. The two end portions 4 of the hanger member rise above the insulator cap 2 and are provided with bolt-holes so that they may be readily attached to the support. In the structure shown I provide preferably two short ear members 5 which are adapted to be fastened to the trolley wire 6 at some distance apart. The trolley wire shown is of the grooved type, and hence the ear members 5 are constructed to suit this type of trolley wire. The ear members 5 have longitudinal grooves 7 in their under side in which the trolley wire fits. The lips or walls 8 of these ear members are made bendable so that they may be bent into the grooves 9 in the trolley wire and thereby properly hold the trolley wire. These ear members are preferably made of extruded or any suitable metal and are provided with a central up-standing web or flange 10. These webs or flanges 10 are formed so as to fit correspondingly shaped slots in the end bosses or members 11, and are fastened therein by means of the bolts or screws 12, thus making it possible to remove or replace the extruded metal ears 5 whenever necessary. These end bosses or members 11 are supported at the ends by a member 13 which is preferably in the form of a flat strap of spring steel. The tops or upper portions of the end bosses 11 are preferably made in the form of circular disks 14 and flat so as to provide substantial seats for the ends of the supporting strap 13. The strap 13 may be fastened to the bosses 11 in any suitable manner, but I prefer to form central up-standing projections 15 which pass through coresponding holes in the end of the strap 1 and riveted or swaged over on top of the straps in the form of heads 16.

The strap 13 may be attached to the hanger member A in any suitable manner, but I prefer to provide a small boss or socket member 17 positioned centrally intermediate the ends of the strap and having a threaded socket for the reception of the threaded stud or bolt 3 on the hanger member. The suspension boss 17 has a horizontal slot 18 in its lower end through which the strap 13 is passed before its ends are riveted to the end bosses 11. A bolt or screw 19 is passed up through the strap from the lower end of the suspension boss 17 which prevents any relative movement of the suspension boss and strap. With my improved construction the trolley wire is suspended from two separated points instead of one, as usual, and the spring strap 13 offers a yielding resistance to the upper pressure exerted upon the trolley wire by the trolley pole, thus rendering the trolley wire flexible and not likely to become crystallized. It will be noted that the strap 13 is sufficiently rigid longitudinally to prevent any longitudinal movement of the device with respect to the trolley wire and hanger, and also to hold the structure against lateral twisting or tipping with respect to the hanger, especially when the device is used on curves. Furthermore, while the strap 13 has flexibility sufficient to provide a flexible suspension for the trolley wire, I prefer that it be stiff enough to prevent it from sagging or causing the portion of the trolley wire intermediate the ears to buckle.

It will be obvious to one skilled in the art, after having obtained an understanding of my invention from the disclosures herein made, that my invention may be readily modified without departing from the spirit thereof, and I wish it to be so understood.

What I claim is:

1. In a device of the class described, the combination of two separated members rigidly attachable to the trolley wire, a supporting means, and a single flexible means interposed between and rigidly secured to said members and said supporting means.

2. In a device of the class described, the combination of a supporting member, and a flexible suspension strap rigidly attached to the member and to the trolley wire at separated points.

3. In a device of the class described, the combination of a pair of separated members adapted to be fixed to the trolley wire, a flexible member rigidly attached at its ends to said separated members, and suspension means rigidly attached to said flexible member intermediate the ends.

4. In a device of the class described, the combination of a resilient suspension member, means on said suspension member at separated points for rigid attachment to the trolley wire, and an intermediate supporting means rigidly attached to said resilient member.

5. In a device of the class described, the combination of a plurality of ear members rigidly attachable to the trolley wire to be suspended, a resilient member connecting said ear members and rigidly secured to them, and an intermediate supporting member rigidly connected to the resilient member.

6. In a device of the class described, the combination of a pair of ear members rigidly attachable at separated points to the trolley wire to be suspended, a resilient strap member rigidly connected to and supporting said ear members, and an intermediate suspension member rigidly attached to said resilient strap.

7. The combination of a spring strap member, a suspension member rigidly attached thereto intermediate the ends thereof, bosses secured at the ends of said spring strap member, and ear members removably and rigidly attached to said end bosses and adapted for rigid attachment to the trolley wire to be suspended.

8. The combination of a hanger member adapted for attachment to a suitable support, a spring strap centrally and rigidly supported by said hanger member and disposed substantially parallel to the trolley wire, bosses secured to the ends of said strap, and ear members removably but rigidly attached to said end bosses and adapted for rigid attachment at separated points to the trolley wire to be suspended.

9. The combination of a hanger member adapted for rigid attachment to a suitable support, a spring strap centrally and rigidly supported by said hanger member and disposed substantially parallel to the trolley wire, bosses secured to the ends of said strap, and extruded ear members removably but rigidly attached to said end bosses and adapted for rigid attachment at separated points to the trolley wire to be suspended.

In testimony whereof I have signed my name to this specification, in the presence of two subscribing witnesses, on this 13 day of February A. D. 1914.

GLENN HENRY BOLUS.

Witnesses:
JOHN L. YOUNG,
W. C. STARKEY.